Feb. 10, 1959 E. O. KEIZER 2,873,406

COLOR TELEVISION SWITCHING CIRCUITS

Filed Feb. 12, 1954 3 Sheets-Sheet 1

INVENTOR.
EUGENE O. KEIZER
BY [signature]
ATTORNEY

Feb. 10, 1959 E. O. KEIZER 2,873,406

COLOR TELEVISION SWITCHING CIRCUITS

Filed Feb. 12, 1954 3 Sheets-Sheet 2

INVENTOR.
EUGENE O. KEIZER

BY [signature]
ATTORNEY

Feb. 10, 1959 E. O. KEIZER 2,873,406

COLOR TELEVISION SWITCHING CIRCUITS

Filed Feb. 12, 1954 3 Sheets-Sheet 3

INVENTOR.
EUGENE O. KEIZER

BY [signature]

ATTORNEY 2,873,406

COLOR TELEVISION SWITCHING CIRCUITS

Eugene O. Keizer, Princeton, N. J., assignor to Radio Corporation of America, a corporation of Delaware Application February 12, 1954, Serial No. 409,887

17 Claims. (Cl. 315—26)

The present invention relates to switching circuits, and more particularly to switching circuits of the type employed with color image reproducers in color television receivers.

Color television is the reproduction on the viewing screen of a receiver of not only the relative luminescence or brightness, but also the color hues and saturations of the details in the original scene.

The electrical transfer of images in color may be accomplished by additive methods. Additive methods produce natural color images by breaking down the light of an object into predetermined selected or primary colors. Color images may then be transferred electrically by analyzing the light from an object into not only image elements, as is accomplished by a normal scanning procedure, but also by analyzing the light from elemental areas of objects or images into selected primary or component colors, and thereby deriving therefrom a signal representative of each of the selected component colors. A color image may then be reproduced at a remote point by appropriate reconstruction from a component color signal train.

There are many methods of providing suitable reconstruction of the component incremental areas which form an overall color television picture. As is discussed by E. W. Herold in his paper "Methods Suitable for Color Television Kinescopes" in the RCA Review, September 1951, part II, one of the earliest proposals for a color kinescope involved the replacement of white phosphor screen by one of ruled phosphor lines of three colors in succession. This idea has been embodied in at least the following patents: R. Rudenberg, U. S. Patent 1,934,821 and M. von Ardenne, British Patent 388,623. For full definition and vertical resolution, line screens require phosphor lines which are of a size less than one-third of the distance between scanning lines when scanned parallel, or less than one-third of a picture element size when scanned transversely. In the use of such a technique, problems of scanning accuracy and minimum spot size of the scanning beam are involved. In addition, there are numerous circuit aspects which have to be solved in order to make possible the use of such a color kinescope technique. One such circuit aspect is the achievement of automatic registry by controlling signals so that the beam will not produce color error by having the beam misregistered or incorrectly focused. Another is the precise method of switching the electron beam or beams in such a tube so that the reconstruction of line or elemental components of the color picture may be accurately accomplished. In more recent years there have been developed a number of color kinescopes which employ the line screen technique. Such a tube is discussed, for example, by Bond, Nicoll and Moore in a paper entitled "Development and Operation of a Line Screen Color Kinescope" in the Proceedings of the IRE, October 1951. These tubes differ primarily in the precise position of the switching mechanism which is used to register the electron beam on the desired color line at the right time.

For the sake of completeness, it is appropriate to add that there are other ramifications of the color kinescope which involve switching using various types of switching arrangements and grids. One is a grid control color kinescope which is described by Stanley V. Forgue in a paper entitled "A Grid Controlled Color Kinescope" in the September 1951 issue of the RCA Review which describes a color kinescope using a series of closely spaced screens, each covered with a different primary color phosphor and separated from each other by fine mesh control grids. Small voltage changes of these grids control the depth of penetration of the scanning beam or beams into this assembly of screens. Another type of color kinescope is that described by Weimer and Rynn in a paper entitled "A 45° Reflection Type Color Kinescope" in the September 1951 issue of the RCA Review. In this tube, which is of the single gun type, the color is changed by applying a control voltage directly to a screen assembly. The screen assembly consists of a multiapertured metal plate coated on the front side with red, green, and blue phosphor strips and mounted parallel to a glass plate coated with a transparent conductive film. An electron beam scans the back of the metal plate at an angle of incidence of approximately 45°. The portion of the beam passing through the slots is reflected by the electric field between the plates causing it to fall back on one set of phosphor strips. By use of a proper aperture and switching arrangement the beam can be shifted from one color phosphor to another.

In all of these methods of producing a color image on the face of a cathode ray picture reproducer, switching grids or electrodes of one type or another presenting largely a capacitive load are employed. In order for the switching to be accomplished to give accurate registry, it is necesary to place more emphasis on the switching circuits which are employed with these switching grids or electrodes. The present invention is intended to provide a major advance and solution of this very important problem.

It is therefore an object of this invention to provide a method for charging or discharging a load capacitor at a rapid rate.

It is yet another object of this invention to provide a switching circuit which can provide fast-rise-time rectangular waves across a high capacitance load.

It is still another object of this invention to provide an efficient switching circuit which produces rapid-rise-time step voltages across a load of high capacitance.

It is still another object of this invention to provide a fast-rise-time switching circuit which can be utilized to switch voltages on control electrodes of color television reproducers when high capacitance exists between these control electrodes.

It is still a further object of this invention to provide an efficient and accurate method of driving the high capacitance switching arrangement of a line type color kinescope.

According to this invention the capacitor load, which may or may not be the switching array of a tri-color kinescope, is driven by a two-vacuum-tube symmetrical system using four identical resistors and two condensers. A resistor is connected from each of the anodes of the vacuum tubes to the power supply. A resistor is connected from each of the cathodes to ground. The capacitive load is connected between the cathodes, and condensers are cross-connected between the anodes and the cathodes. When one tube is biased off by a switching signal, the load sees zero voltage at the cathode of the biased off tube and roughly one-half the power supply voltage at the cathode of the conducting tube. When, by suitable change in switching voltages on the grids of these vacuum tubes, the biased off tube is turned on and the other tube is biased off, the voltage across the capacitive load reverses. By utilizing the vacuum tubes as a discharge system for the condensers involved, switching can be accomplished at very fast rates across loads having very large capacitance.

Other and incidental objects and advantages of the present invention will be understood after reading the following specification and an inspection of the accompanying drawings in which:

Figure 6 shows a basic two-switch switching circuit wherein Figure 6A shows the condition where the switches are open, Figure 6B shows the condition where one switch is open and the other switch is closed, and Figure 6C shows the condition where the reverse is true;

The present invention will be discussed from two points of view. One is based on its utility as a switching circuit which can find use in numerous types of radar, television, radio and communication systems. The other point of view is that of a switching circuit which is uniquely qualified to perform the function of grid switching in a color kinescope which employs switching of grid structures near to the face plate or plane which contains the phosphorous strips or segments. It can easily be shown that the present invention also has utility to color kinescopes which have grid switching structures which are in the vicinity of the cathode ray gun rather than the screen. However, since the duty required on such switching structures in such a position is considerably less than that required in structures for the kinescope to the phosphor screen, the discussion will be limited principally to the latter type of color kinescope.

Figure 1:
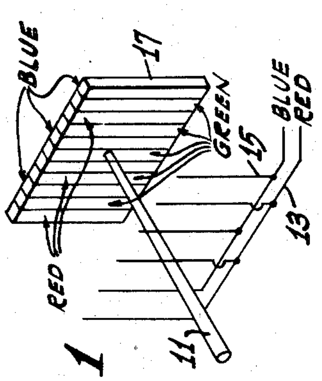
Figure 1 shows the focusing action, the phosphor sequence and placement in a single gun line segment color kinescope employing switching electrodes near the screen.

Consider the switch and screen structure shown in Figure 1. The face plate 17 has impregnated on its strips of phosphors which are oriented so that a red strip is followed by a green strip which is in turn followed by a blue strip, which is in turn followed by a green strip, and so on. Note the presence of the grids 13 and 15. The grid 13 is placed so that it is oriented with the red phosphor strip, and the grid 15 is oriented with respect to the blue phosphor strip. The grid wires as shown are parallel to the phosphor lines at a distance behind the phosphor. Note too that the grid wires fall behind or are related to each red or blue phosphor strip with none behind the green. If only a single electron beam 11 is present, then the electron beam will pass through the grid structure to fall on whichever phosphor strip is demanded by the particular component of the color television picture being transmitted at that time. Therefore, all of the wires that fall behind the red phosphor strips are electrically tied together and are brought out to a single terminal at the side of the tube. Likewise, all of the wires behind the blue phosphor strips are tied together and brought out to an external terminal.

If no difference in potential is placed between the blue and red grids the electron beam will travel down the tube from the cathode ray gun and will hit the green phosphor strip so that if the cathode ray is made to scan, a green image will appear on the face plate of the color kinescope.

If a potential difference is applied between the sets of grids to deflect the focus beam in the direction of the positive wire, this voltage can be made of such magnitude that the beam will strike a phosphor strip adjacent to the green thus rendering a red or blue on the image plate depending on which set of wires is positive. Separate colors therefore can be displayed by simply switching the potential of these wires. With a color switching device of this type the color displayed depends only on the potential of the wires so that no color distortion or contamination can result from nonlinear sweeps or minor inaccuracies in the gun position.

Figure 2:
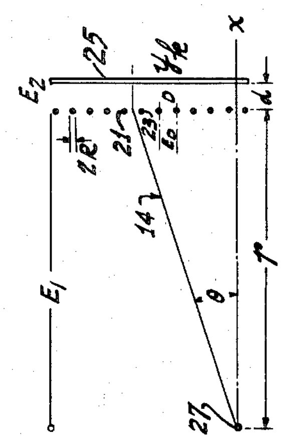
Figure 2 shows a schematic cross section of the device shown in Figure 1 showing the relative position of the various elements and the symbols which will be employed in the text.

The operation and physical requirements of such a structure such as that shown in Figure 1 may be illustrated by the following discussion. Once the potentials applied and the geometry of the tube are known, the physical constants and the drive requirements for tubes of this type may be derived. The defining symbols for the physical dimensions and potentials are shown in Figure 2. The reciprocal of the mean velocity in the region between the wire-grid and the screen at any angle $\theta$ can be shown to be $$\frac{1}{\bar{v}_x}=\sqrt{\frac{m}{e10^7}}\sqrt{\frac{2E_1}{E_2^2}}\cos\theta\left[\sqrt{1+\frac{E_2}{E_1\cos^2\theta}}-1\right] \qquad (1)$$

Defining $v_y$ as the velocity of the electrons parallel to the grid in the same region as above, then $$\Delta y=\frac{v_y}{\bar{v}_x} \qquad (2)$$

This is the displacement on the phosphor screen due to $v_y$, no matter what the cause of $v_y$. Evaulating the "y" direction-spot displacement on the screen due to scanning, the $y$ component is $$v_{y_1}=\sqrt{\frac{e10^7}{m}}\sqrt{2E_1}\sin\theta^2 \qquad (3)$$

and it follows that $$\Delta y_1=d\frac{E_1}{E_2}\sin 2\theta\left[\sqrt{1+\frac{E_2}{E_1\cos^2\theta}}-1\right] \qquad (4)$$

This relationship tells where an electron will strike the screen if it has been deflected by an agnle $\theta$, or simply if it arrives at the lens at the angle $\theta$. This equation is used to determine the phosphor placement for the single-gun tube. For a fixed-beam displacement, the switching potential required varies inversely as the capacity; for higher-definition tubes where the wires are closer together, the deflection voltage will actually diminish. However the capacity will increase therefore still requiring circuits of the types taught by the present invention. To express this potential completely in terms of the geometry of the tube, the capacity between wires per unit length is described approximately as, with $\epsilon$ the dielectric constant, $$C=\frac{\epsilon}{4\,\mathrm{Log}\,\frac{D}{R}} \qquad (5)$$

To switch colors the beam must be deflected 1/3 D. So.

$$E_D = \frac{2E_1}{\pi} \frac{D}{d} \operatorname{Log} \frac{D}{R} \qquad (6)$$

This is the required color-switching voltage in terms of the geometry of the tube.

As an example of the actual number that comprise a complete design, consider for a tube with the wires placed 320 mils behind the phosphor screen, and with a distance between wires of 30 mils, a wire diameter of 6 mils, an accelerating potential of $E_1$=4,000 volts; the switching potential required is $E_d$=540 volts. The electrons striking the screen are 16-kv. electrons, due to the post acceleration obtained by the focusing potential. The total capacity of a grid for a screen size of 12 x 16 inches is approximately 1,200 $\mu\mu f$. The width of a three-color cell at the phosphor surface, as determined from (4) using the 125th pitch as constant for the entire image plate is 30.74 mils. No correction from this constant pitch is required for deflection angles to 69 degrees. If wider-deflection angles are desired, the phosphor centers can easily be distributed about 2 or 3 mean values. These values illustrate the necessity of devising a suitable switching mechanism whose requirements are ably fulfilled by the present invention.

Figure 3:
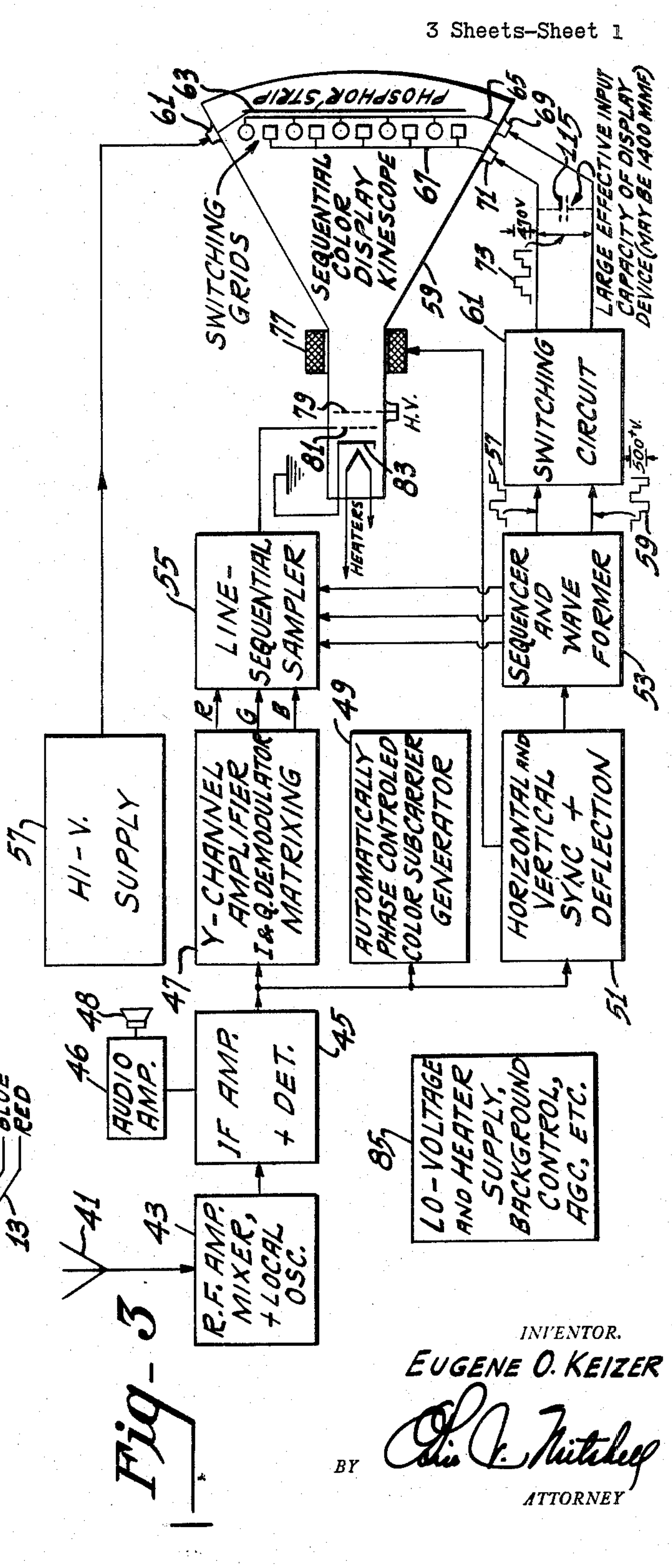
Figure 3 shows the block diagram of a line sequential color television receiver using a sequential display type color kinescope.

Figure 3 shows the block diagram of a color television receiver using the present invention in one of its forms for driving the high capacity switching grids of a sequential display color kinescope. The color television signal arrives at the antenna 41 as transmitted from the transmitter. This video signal contains several different types of information. One is the audio information, which is the sound accompanying the picture. One is the synchronizing information which is used to drive the deflection circuits of the color television receiver. A third type of information is the luminance information which corresponds to the monochrome information or black and white information. Accompanying this luminance information is the chrominance information. Chrominance information consists of color information which has been used to modulate a color subcarrier having a frequency of 3.58 mc. This color information is actually transmitted in a form of two chrominance signals, I and Q signals, which, by using suitably connected balanced modulators in the transmitter, form side-band information around the color subcarrier which can be removed from this color subcarrier in the receiver by use of the processes of synchronous detection. In order that the color information may be subjected to accurate synchronization so that the color receiver will properly provide accurate color selection, a color synchronizing burst is introduced into the video signal; more specifically this color synchronizing burst consists of approximately 8 cycles of the color synchronizing subcarrier signal and is located on the back porch of the horizontal synchronizing pulse. The phase of this color synchronizing burst is such that it is accurately phased with respect to both the I and the Q signals.

The color television signal enters the R. F. amplifier mixer, and local oscillator 43 where it is heterodyned to the intermediate frequency and applied to the I. F. amplifier and detector 45 where the video and audio information is recovered. The audio information is separated from the video information by use of, for example, the well known principle of intercarrier sound; the audio information is sent through the audio amplifier 46 and then to the loud speaker 48. The luminance or Y signal and the I and Q signals (which are transported by the color subcarrier) are then sent to the Y channel amplifier, the I and Q demodulator, and the matrix circuit 47 where the red, green, and blue signals are extracted from the combined color and luminance signals. Coincident with this treatment of the Y, I and Q signals is the operation of the automatically phase controlled subcarrier generator 49 which, by utilizing the color synchronizing burst in the video signal, produces an accurately phased local subcarrier signal which is used in the processes of synchronous detection in circuit 47 to provide the I and Q signals which are used for the ultimate recovery of the red, green, and blue signals. The video amplifier output is also sent to the horizontal and vertical synchronizing and deflection circuits 51 which drive the deflection yokes 77, in addition to other features which will be discussed.

The picture tube used is the sequential color display kinescope 59. The image screen on this kinescope is composed of strips of phosphor strip as previously described in connection with Figure 1. Immediately behind these phosphor strips is the set of color switching grids 65 and 67 which have a set of terminals on the kinescope, namely terminals 69 and 71. A high voltage supply 57 is then supplied in the color television receiver to supply not only the high voltage potential to terminal 61, which applies the proper potential to the phosphor strips 63, but also gives suitable voltage to other high voltage components of the color television receiver.

Figures 4, 5:
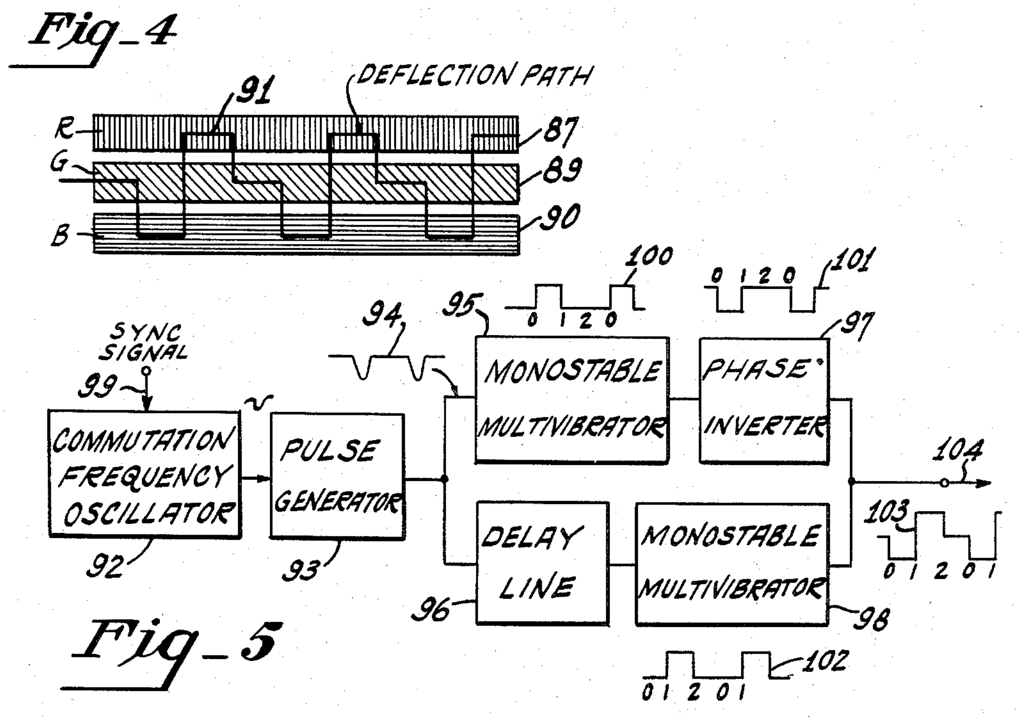
Figure 4 shows a staircase deflection path.
Figure 5 shows a typical circuit for producing a staircase voltage.

There are many methods of using the persent color television signal which conforms to the NTSC signal standards which were approved by the Federal Communications Commission on December 17, 1953, for operating a sequential display type of color kinescope. Consider the staircase deflection path 91 as shown in Fig. 4. If the duration time of each step of this particular type of waveform is made sufficiently short, the sequential color display kinescope then provides what is essentially a reasonable counterpart of the well known processes of dot sequential representation which are employed in tricolor kinescopes of the type, for example, described by H. B. Law in his paper "A Three Gun Shadow Mask Color Kinescope" in the RCA Review for September 1951, part II. It can be shown that dot sequential type representation is a more efficient means of utilizing the color spectrum than that of strictly line sequential representation. However, in order to alleviate the demands made on the staircase wave generator, it is also practical to allow each step of the staircase to continue for an entire line without undue deterioration of the color representation. This then yields the technique of line sequential color television scanning which is well known in the art.

Figure 6:
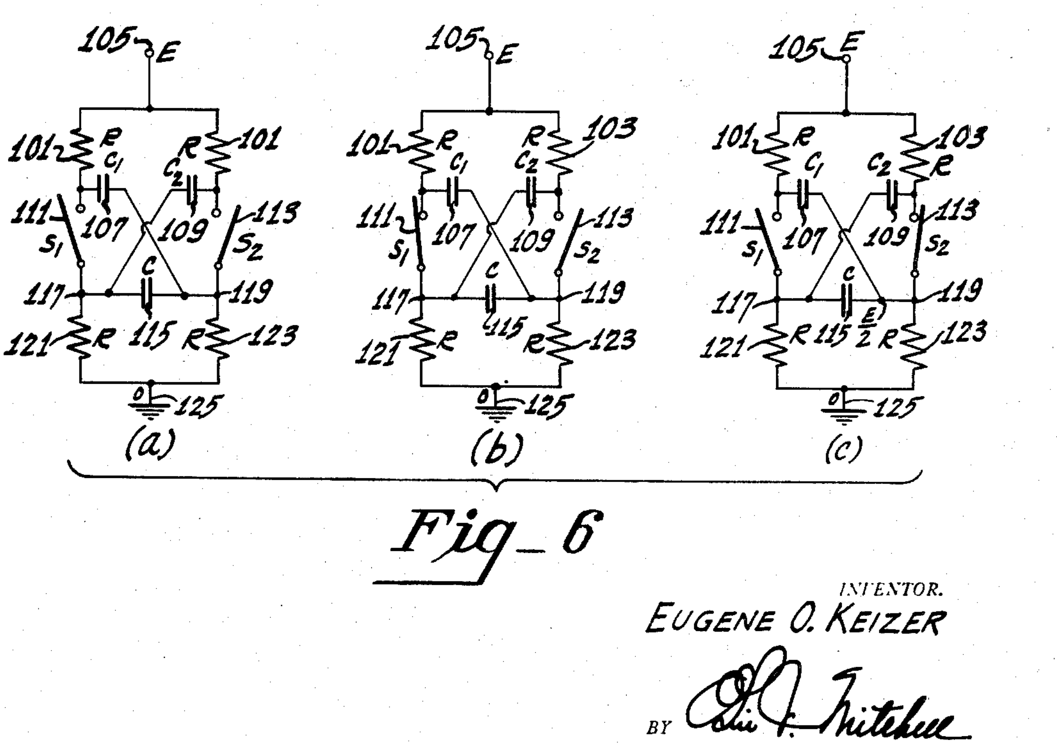

There are many means of producing a staircase type of wave such as that illustrated in Figure 4 by the deflection path 91. Among those methods known in the art is that shown in its basic form in Figure 5; this method has been employed by Bond, Nicoll and Moore in their development of line screen color kinescopes and is outlined in Figure 6 of their paper "Development and Operation of a Line Screen Color Kinescope" in the "Proceedings of the IRE" of October 1951. In this method, as shown in Fig. 5, a synchronizing signal is applied to terminal 99, this synchronizing signal synchronizes a commutation frequency oscillator 92 which in turn provides a wave of correct frequency and phase to the pulse generator 93. This pulse generator then drives a monostable multivibrator 95 which produces pulses as shown by the waveform 100. This waveform 100 is passed through the phase inverter 97 to produce the waveform 101. The pulse generator 93 also drives delay line 96 which in turn impresses a delayed pulse signal on the monostable multivibrator 98 which produces waveform 102. By adding together waveform 102 and waveform 101, noting the timing intervals associated with these waveforms, the staircase wave 103 appears at terminal 104.

Returning now to the block diagram in Figure 3, the red, green, and blue signals are applied to a line sequential sampler 55 which is also controlled by the sequencer and waveformer 53. The combination of the line sequential sampler 55 and the sequencer and waveformer 53 delivers to the kinescope control grid 81 the red, green, and blue signals in synchronism with the waveform which is applied to the deflection grids 65 and 67 of the sequential color display kinescope 59. The sequencer and waveformer 53 then applies the staircase waveforms 57 and 59, each having a total peak-to-peak amplitude of about 500 volts, to the switching circuit 61. This switching circuit 61 then applies the staircase wave 73 having a peak-to-peak voltage of 470 volts to the grid switching terminals 71 and 69 across which is presented an effective input capacity of approximately 1400 $\mu\mu f$. The present invention forming the switching circuit is an improved method of applying this staircase voltage 73 across this effective input capacity 115 so that the shape of the staircase wave is effectively maintained rectangular and the peak-to-peak voltage necessary to produce the switching can be produced.

Turning now to Figure 6A, there is shown a basic circuit of block 61 of Figure 3. Two switches 111 and 113 represent tubes and the capacitance 115 represents the switching grid input capacitance. Figure 6B shows the condition where the switch 111 is closed and the switch 113 is open. The voltages as developed between the voltage terminal 105, upon which is impressed the voltage E and the ground terminal 125, are considered to be voltages to ground.

In Figure 6A consider the potentials which exist at terminals 117 and 119. When both switches 111 and 113 are open, the potentials at terminals 117 and 119 are at zero.

In Figure 6B let switch 111 be closed. It is evident from the nature of the circuit that since the potential E is applied to the terminal 105, and since all resistors are of equal magnitude, a potential $E/2$ will appear at the terminal 117, namely at the switch and a potential equal to ground potential will appear at the terminal 119. If, as is shown in Figure 6C, the switch 111 is opened and switch 113 is closed, then the terminal point 117 will be at ground potential and the terminal point 119 will take on the potential of $E/2$. Thus is embodied the basic concept of the present invention whereby by proper control of the switches 111 and 113, the potentials at terminals 117 and 119 will be reduced to zero or to $E/2$ depending on the precise sequence of opening and closing of the switches. It is evident that if the switches 111 and 113 are both closed, then terminals 117 and 119 will both attain the potential of $E/2$. If the switches are closed alternately, a push-pull square wave voltage will appear across the capacitance 115, and, if the resistance of the switches is low, the rise times of square wave will be short for both positive and negative going voltage charges.

Figure 7:
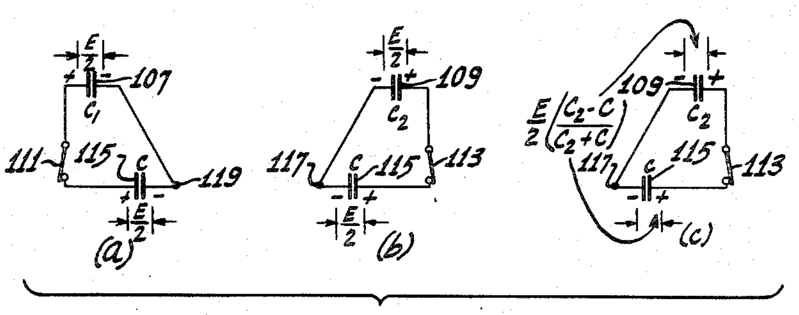
Figures 7A and 7B show the capacitive paths corresponding to Figures 6B and 6C respectively.
Figure 7C shows the voltage across the condensers shown in Figure 7B at the moment of switching.

Figure 7A shows a voltage of $E/2$ across condensers 107 and 115; this represents the rest condition of the circuit of Figure 6B wherein switch 111 is closed and switch 113 is open.

Figure 7B shows the situation at the instant that the switch 111 is opened and switch 113 is closed. Very shortly after this time, the charge shifts quickly resulting in the voltage across the condensers shown in Figure 7C. This voltage has the magnitude $$\frac{E}{2}\left[\frac{C_2-C}{C_2+C}\right]$$

The voltage just after switching will depend upon the ratio of the magnitudes of the condensers 109 and 115. If the condenser 109 is much larger than condenser 115 the voltage is almost $E/2$ in magnitude. The resistors continuously charge all capacitors toward a final voltage of $E/2$.

Figure 8:
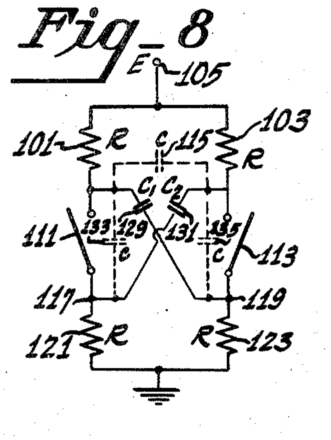
Figure 8 shows another possible connection of the circuit shown in Figure 6A.

In operation, a point of equilibrium is reached when the continuous charging through the resistors balances the total charge, and the quick discharges at the instants of switching. The average voltage across condensers 107 and 109 will then be somewhat less than $E/2$. In this way the value of each of the resistors 101, 103, 121 and 123 determines the average peak-to-peak output in terms of supply voltage; if the resistance is made too large, the output voltage will decrease although the rise times will remain short. For given values of the output capacitance 115 and each of the resistors 101, 103, 121 and 123, the sizes of capacitances 107 and 109 determine the slope of the flat portion of the rectangular wave. When capacitors 107 and 109 are large enough, the slope can be made very small. There are several possible connections for connecting in the load capacitor 115. Figure 8 shows another possible series of connections which can be shown to have substantially the same operation as that associated with the circuit shown in Figure 6A.

When tubes are used in place of switches, the operation is somewhat like that of switches with resistors in series with them. Both tubes are essentially in parallel with the load capacitor 115 and with the power supplying the potential E but their conduction results in opposite polarities voltage across the load.

Figure 9:
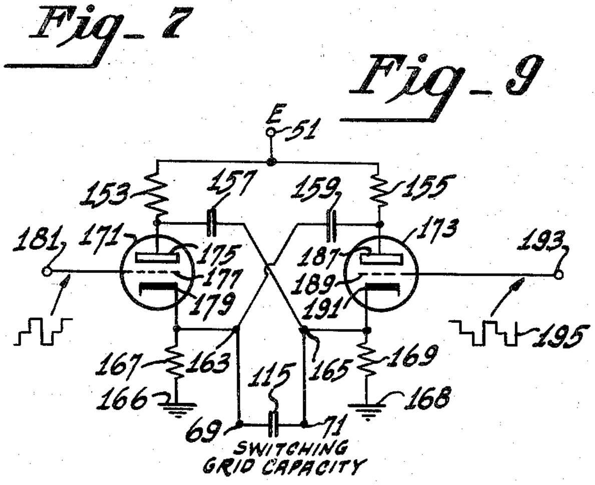
Figure 9 shows a version of the circuit shown in Figure 6A for the connection wherein triodes are used.

Figure 9 shows a version of the circuit shown in Figure 6A using triodes; this circuit is useful when the desired output voltage is not large. Here the switches 111 and 113 in Figure 6A are replaced by the triodes 171 and 173 respectively. And, it is seen that by impressing the proper waveform on the grid terminal 181 for triode 171 and the oppositely polarized waveform 195 on the terminal 193 of tube 173, the switching circuit may be utilized to produce the desired switching across the capacitor 115. Although the staircase voltage is shown, it is evident that other types of voltages such as pulse voltages, rectangular voltages, and step voltages may also be employed for switching to give corresponding output waveforms provided that the correct amplitudes and polarities are produced at each of the grid terminals.

The circuit in Figure 9 utilizing triodes has one disadvantage; for very large voltages the triodes acquire a remote cut-off and therefore need more grid swing to obtain a given output.

Figure 10:
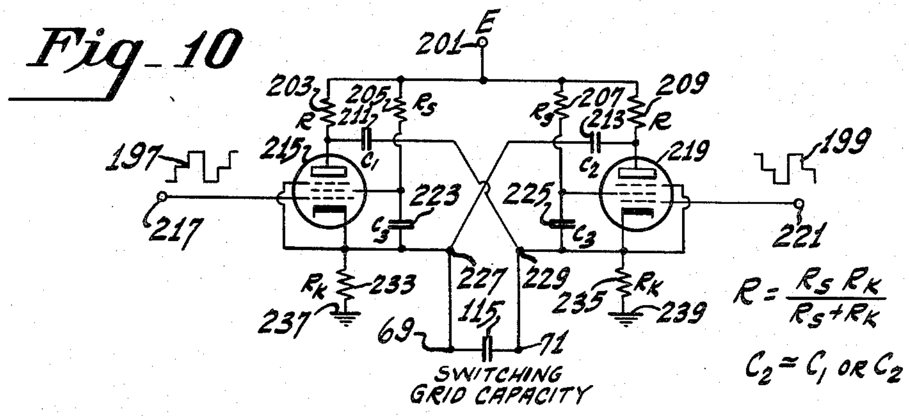
Figure 10 shows a pentode version of the basic circuit in Figure 6A.

Figure 10 shows how pentodes may be used to overcome this difficulty. In this circuit the switches 111 and 113 of the switching circuit in Figure 6A are replaced by the pentodes 215 and 219 respectively. The circuit is also modified to accommodate the fact that the screen grid-to-cathode voltage may be held nearly constant near the switching cycle for the condenser 225 for tube 219. By utilizing these condensers the A.-C. cut-off voltage remains normal and the voltage output can be almost as large as the voltage input.

These switching circuits do not amplify voltage; they therefore offer advantages only when the load capacities are considerably larger than their capacities. For fast rise times, tubes able to supply high peak currents are best; 6CD6's capable of peak currents of ½ ampere at reasonable voltages are excellent for supplying the needs of the color grid switching in a sequential display type kinescope of the type numbered 58 in Figure 3. For less stringent rise time requirements, 6CL6's and 6CB6's may be satisfactory.

The waveforms that may be handled by the basic switching circuit to advantage are those in which the charging current, in and out of the load capacity, must have high values compared to the average value. It is evident therefore that this circuit is not only useful in applications involving pulse and rectangular waveforms but also in handling the staircase waveforms which are so useful in this type of color kinescope which has been discussed in connection with the present invention.

It is interesting to note that a single ended capacitive load may be driven by the present invention by providing a duplicate dummy load grounding one side of each load, and using the remaining two terminals as though they were the terminals of the capacitive loads or switching grid capacities which have been incorporated into the various figures describing the forms of the present invention. However, in this case, the loads, push-pull input voltages, stray capacities, etc. must also be well balanced to ground.

Having described the invention, what is claimed is:

1. A switching circuit for changing voltage across an impedance load, comprising in combination, a first potential divider network including a circuit-opening switching means at a prescribed potential point, a second potential divider network identical to said potential divider network, a source of energizing potential having a high potential terminal and a low potential terminal, means for connecting said first potential divider network and said second potential divider network in parallel between said high potential terminal and said low potential terminal, a capacitive impedance load connected between the low potential sides of said circuit-opening switching means on said first potential divider network and said second potential divider network, a pair of condenser discharge circuit means, means for cross-connecting said pair of condenser discharge circuit means across said circuit-opening switching means of said first potential divider network and said second potential divider network, and means for alternately opening and closing said switching means in said first potential divider network and said second potential divider network at a prescribed rate corresponding to the development of a prescribed waveform across said impedance load.

2. A switching circuit comprising in combination, a source of energizing potential having a high potential terminal and a low potential terminal, a first switch network, said first switch network consisting of a first impedance, a second impedance and a first switch with said first impedance and said second impedance and said first switch connected serially having said first switch the mid member, a second switch network, said second switch network consisting of a third impedance, a second switch, and a fourth impedance with said third impedance and said fourth impedance and said second switch connected serially having said second switch as a mid member, means for connecting said first switch network and said second switch network in parallel between said high potential terminal and said fixed low potential terminal with said first impedance and said third impedance toward said low potential terminal, a capacitive output load, means for coupling said capacitive output load between prescribed connection points on said first impedance and said third impedance, said connection points being equipotential with respect to each other and located at points of prescribed potential, a pair of capacitors, said pair of capacitors cross-connected between said connection points and the high potential terminal ends of said switches, and means for causing said switches to open and close in a prescribed sequence to form a prescribed waveform between said connection points corresponding to said sequence.

3. The invention as set forth in claim 2 and wherein said impedances are all resistors of identical magnitude.

4. The invention as set forth in claim 2 and wherein said connection points are located at the junctions of the corresponding impedances and switches.

5. A switching amplifier circuit for switching the voltage across a high capacitance load, comprising in combination, a source of energizing potential including a fixed potential terminal, a first electron tube and resistance network connected across said source, said electron tube having a control electrode, said first electron tube and resistance network having a potential terminal, said first electron tube and resistance network characterized in that the potential between said potential terminal and said fixed potential terminal depends upon whether said electron tube is conducting or non-conducting, said conducting or non-conducting dependent potential being a function of the potential applied to said control electrode, a second electron tube and resistance network connected across said source, said second electron tube and resistance network identical to said first electron tube and resistance network, a high capacitance load connected between the potential terminals of said first electron tube and resistance network and said second electron tube and resistance network, discharge path means, means for coupling said discharge path means between said first electron tube and resistance network and said second electron tube and resistance network to provide discharge paths with suitable time constants commensurate with the rise time required across said high capacitance load in response to an abruptly changing waveform, and means for applying suitable potential to the control electrodes of said first electron tube and resistance network and said second electron tube and resistance network to render each of said electron tubes conducting or non-conducting in a prescribed sequence to produce a prescribed waveform across said high capacitance load and wherein said discharge path means are condensers.

6. A switching amplifier circuit for switching the voltage across an impedance load, comprising in combination, a source of energizing potential having a high potential terminal and a fixed potential terminal, a pair of identical cathode follower circuits, each of said cathode follower circuits having a cathode resistor, an anode resistor, and an electron control tube, said electron control tube having an anode, a cathode, and at least a control grid, means for connecting said cathode resistor between said cathode of said electron control tube and said fixed potential terminal, means for connecting said anode resistor between said high potential terminal and the anode of said electron control tube, an impedance load, means for connecting said impedance load between the cathodes of said electron control tubes, a pair of circuit discharge networks, means for connecting one of said pair of circuit discharge networks between the anode of the first of said pair of electron control tubes and the cathode of the second of said pair of electron control tubes, means for connecting the second of said other pair of electron discharge networks between the cathode of the first of said pair of said electron control tubes and the anode of the second of said pair of electron control tubes, and means for applying suitable signals to the control grids of said electron control tubes to render said pair of electron control tubes alternately conducting and non-conducting in a sequence designed to form a prescribed switching waveform across said impedance load.

7. The combination of a sequential color display kinescope system, said sequential color display kinescope employing an image plate, said image plate having a sequence of strips of phosphors of component colors arranged in a prescribed sequence and employing a two-terminal system of switching grids for directing the kinescope electron beam to the prescribed phosphor strips at corresponding instants, means for applying an appropriate switching voltage across said two-terminal system of switching grids, said switching voltage applying means including a fixed potential terminal, a first resistance and switching network, said first resistance and switching network having a potential terminal and a control terminal, said first resistance and switching network characterized in that the difference in potential between said potential terminal and said fixed potential terminal is a function of a voltage applied to said control terminal, a second resistance and switching network, said second resistance and switching network also having a potential terminal and a control terminal and also characterized in that the difference in potential appearing between said potential terminal and said fixed potential terminal is a function of the voltage impressed on said control terminal, means for connecting said two-terminal system of switching grids between the potential terminals of said first resistance and switching network and said second switching and resistance network, discharge path means, means for coupling said discharge path means between said first resistance and switching network and said second resistance and switching network to provide discharge paths with suitable time constants commensurate with the desired rate of change of voltage across said two-terminal system of switching grids, means for impressing suitable potential waveforms in prescribed sequence and polarity on the control terminals of said first resistance and switching network and said second resistance and switching network to produce switching waveforms across said two-terminal system of switching grids of prescribed shape.

8. In a sequential color display kinescope system, said sequential color display kinescope employing an image plate having a sequence of strips of phosphors of component colors arranged in a prescribed sequence and employing a two-terminal system of switching grids for directing the kinescope electron beam to the prescribed phosphor strips at corresponding instants, means for applying an appropriate switching voltage across said two-terminal system of switching grids, comprising in combination, a first potential divider network including a circuit opening switching means at a prescribed potential point, a second potential divider network including a circuit opening switching means at a prescribed potential point having a prescribed relationship with respect to the prescribed potential point of said first potential divider network, a high potential terminal, a low potential terminal, means for connecting said first potential divider network and said second potential divider network in parallel between said high potential terminal and said low potential terminal, means for connecting said two-terminal system of switching grids between the low potential side of said switching means on said first potential divider network and said second potential divider network, a pair of condenser discharge circuit means, means for cross-connecting said pair of condenser discharge circuit means across said switching means of said first potential divider network and said second potential divider network, and means for alternately opening and closing the switching means of said first potential divider network and said potential divider network at a prescribed rate corresponding to the development of a prescribed waveform across said two-terminal system of switching grids.

9. In a sequential color display kinescope system, said sequential color display kinescope employing an image plate having a sequence of strips of phosphors of component colors arranged in a prescribed sequence and employing a two-terminal system of switching grids for directing the kinescope electron beam to the prescribed phosphor strips at corresponding instants, means for applying an appropriate switching voltage across said two-terminal system of switching grids, comprising in combination, a pair of cathode follower circuits each having a fixed potential terminal, a cathode resistor, an anode resistor, a high potential terminal, and an electron control tube, said electron control tube having an anode, a cathode, and at least a control grid, means for connecting said cathode resistor between the cathode of said electron control tube and said fixed potential terminal, means for connecting said anode resistor between said high potential terminal and the anode of said electron control tube, means for connecting said cathode follower circuits in parallel with the respective high potential terminals tied together and the respective low potential terminals tied together, a potential source, means for utilizing said potential source to impress a high voltage between said pair of said high potential terminals and said pair of fixed potential terminals, means for connecting said two-terminal system of switching grids between the anodes of said electron control tubes, a pair of circuit discharge networks, means for connecting one of said pair of circuit discharge networks between the anode of the first of said pair of electron control tubes and the cathode of the second of said pair of electron control tubes, means for connecting the second of said pair of electron discharge networks between the cathode of the first of said pair of said electron control tubes and the anode of the second of said pair of electron control tubes, and means for applying suitable signals to the grids of said electron control tubes to render said pair of electron control tubes alternately conducting and nonconducting in a sequence designed to form a prescribed switching waveform across said two-terminal system of switching grids.

10. In a sequential color display kinescope system, said sequential color display kinescope employing an image plate having a sequence of strips of phosphors of component colors arranged in a prescribed sequence and employing a two-terminal system of switching grids for directing the kinescope electron beam to the prescribed phosphor strips at corresponding instants, means for applying an appropriate switching voltage across said two-terminal system of switching grids, comprising in combination, a pair of cathode follower circuits each having a fixed potential terminal, a cathode resistor, an anode resistor, a high potential terminal, and an electron control tube, said electron control tube having an anode, a cathode, and at least a control grid, means for connecting said cathode resistor between the cathode of said electron control tube and said fixed potential terminal, means for connecting said anode resistor between said high potential terminal and the anode of said electron control tube, means for connecting said cathode follower circuits in parallel with the respective high potential terminals tied together and the respective low potential terminals tied together, a potential source, means for utilizing said potential source to impress a high voltage between said pair of said high potential terminals and said pair of fixed potential terminals, means for connecting said two-terminal system of switching grids between the cathodes of said electron control tubes, a pair of circuit discharge networks, means for connecting one of said pair of circuit discharge networks between the anode of the first of said pair of electron control tubes and the cathode of the second of said pair of electron control tubes, means for connecting the second of said pair of electron discharge networks between the cathode of the first of said pair of said electron control tubes and the anode of the second of said pair of electron control tubes, and means for applying suitable signals to the grids of said electron control tubes to render said pair of electron control tubes alternately conducting and non-conducting in a sequence designed to form a prescribed switching waveform across said two-terminal system of switching grids.

11. The invention as set forth in claim 10 and wherein said signals applied to the grids of said electron control tubes are staircase waves, each step of said staircase waves suitable for scanning the entire scanning width of the color sequential display kinescope and whereby one staircase wave applied to the control grid of one of said electron control tubes is inverted with respect to the staircase wave applied to the control grid of the other electron control tube thereby yielding a staircase wave across said two-terminal system of switching grids.

12. The invention as set forth in claim 10 and wherein said signals applied to the grids of said electron control tubes are staircase waves, each step of said staircase wave suitable for scanning a prescribed fraction of the total length of a horizontal scanning line, and whereby one staircase wave applied to the control grid of one of said electron control tubes is inverted with respect to the staircase wave applied to the control grid of the other electron control tube thereby yielding a staircase wave across said two-terminal system of switching grids.

13. The invention as set forth in claim 10 and wherein the signals applied to the grids of said electron control tubes are a series of voltage steps of prescribed amplitude and duration for varying the electron beam of the kinescope between the sequence of strips of phosphors in a prescribed sequence, and means for causing the signal which is applied to the control grid of one of said electron tubes to be negatively polarized with respect to the signal which is applied to the control grid of one of said electron electron tubes thereby producing the prescribed switching waveform across said two-terminal system of switching grids.

14. The invention as set forth in claim 10 and wherein each of said electron control tubes also contains a screen grid, means for coupling a resistance between the anode and the screen grid of each of said electron control tubes, and means for coupling a capacitance between the screen grid and the cathode of each of said electron control tubes whereby the screen-to-cathode voltage of each of said electron control tubes may be held substantially constant during the switching cycle.

15. A high speed switching circuit comprising; a source of unidirectional energizing potential; two switching devices each having a control electrode and cathode and anode current flow electrodes, two parallel current paths connected across said source of potential, each of said paths including, in series, an anode impedance, the anode-cathode electrodes of a respective one of said switching devices, and a cathode impedance; discharging capacitors cross connected between the anode of each device and the cathode of the other device; means to apply control signals to the two control electrodes to render said devices conductive and non-conductive in a predetermined sequence; and a large capacitive load connected across two of said current flow electrodes.

16. A high speed switching circuit comprising; a source of unidirectional energizing potential; two switching devices each having a control electrode and cathode and anodes current flow electrodes, two parallel current paths connected across said source of potential, each of said paths including, in series, an anode impedance, the anode-cathode electrodes of a respective one of said switching devices, and a cathode impedance; discharging capacitors cross connected between the anode of each device and the cathode of the other device; means to apply out-of-phase input control signals to the two control electrodes to render said devices conductive and non-conductive in a predetermined sequence; and a capacitive load connected across said cathode electrodes, said capacitive load having a larger capacitance than said discharging capacitance.

17. A high speed switching circuit comprising; a source of unidirectional energizing potential; two switching devices each having a control electrode and cathode and anode current flow electrodes, two parallel current paths connected across said source of potential, each of said paths including, in series, an anode impedance, the anode-cathode electrodes of a respective one of said switching devices, and a cathode impedance; discharging capacitors cross connected between the anode of each device and the cathode of the other device; means to apply out-of-phase input control signals to the two control electrodes to render said devices conductive and non-conductive in a predetermined sequence, and a color kinescope having switching grid connected across two of said current flow electrodes.

References Cited in the file of this patent

UNITED STATES PATENTS

| | | |
|---|---|---|
| 2,166,306 | Levoy | July 18, 1939 |
| 2,248,975 | Faudell | July 15, 1941 |
| 2,299,272 | Halden | Oct. 20, 1942 |
| 2,399,135 | Miller et al. | Apr. 23, 1946 |
| 2,402,053 | Kell | June 11, 1946 |
| 2,446,791 | Schroeder | Aug. 10, 1948 |
| 2,458,599 | Hussey | Jan. 11, 1949 |
| 2,568,448 | Hansen | Sept. 18, 1951 |
| 2,580,073 | Burton | Dec. 25, 1951 |
| 2,586,888 | Varela | Feb. 26, 1952 |
| 2,750,502 | Gray | June 12, 1956 |

UNITED STATES PATENT OFFICE
CERTIFICATE OF CORRECTION

February 10, 1959

Patent No. 2,873,406

Eugene O. Keizer

It is hereby certified that error appears in the printed specification of the above numbered patent requiring correction and that the said Letters Patent should read as corrected below.

Column 6, line 22, for "persent" read -- present --; column 8, line 19, after "power" insert -- supply --; column 13, line 3, for "one of said electron" read -- of the other of said --.

Signed and sealed this 1st day of September 1959.

(SEAL)
Attest:

KARL H. AXLINE

Attesting Officer

ROBERT C. WATSON

Commissioner of Patents